United States Patent [19]

Clifford

[11] Patent Number: 6,133,554
[45] Date of Patent: Oct. 17, 2000

[54] METHOD AND APPARATUS FOR SUBSTANTIALLY MAINTAINING AN AVERAGE HEATING TEMPERATURE OVER A PERIOD OF TIME

[76] Inventor: Todd W. Clifford, 6359 S. Devonshire, Loveland, Ohio 45140

[21] Appl. No.: 09/112,707

[22] Filed: Jul. 9, 1998

Related U.S. Application Data

[63] Continuation-in-part of application No. 08/591,398, Jan. 25, 1996, Pat. No. 5,813,394, which is a continuation-in-part of application No. 08/283,992, Aug. 1, 1994, Pat. No. 5,617,840, which is a continuation-in-part of application No. 07/856,347, Mar. 23, 1992, Pat. No. 5,333,596.

[51] Int. Cl.[7] .................................................. H05B 1/02
[52] U.S. Cl. ........................ 219/494; 219/506; 126/39 R; 126/39 BA; 431/78
[58] Field of Search .................................... 219/497, 501, 219/494, 506, 411, 412; 126/41 R, 39 BA, 39 E; 431/78, 25, 16; 99/325–333

[56] References Cited

U.S. PATENT DOCUMENTS

| | | | |
|---|---|---|---|
| 4,282,422 | 8/1981 | Payne et al. ............................. | 219/486 |
| 4,420,006 | 12/1983 | Moore et al. ......................... | 134/167 R |
| 4,570,054 | 2/1986 | Chidzey et al. ......................... | 219/490 |
| 4,816,647 | 3/1989 | Payne ....................................... | 219/464 |
| 4,993,401 | 2/1991 | Diekmann et al. .................... | 126/39 E |
| 5,575,638 | 11/1996 | Witham et al. ...................... | 126/39 BA |
| 5,771,879 | 6/1998 | Saltzman .............................. | 126/299 F |

*Primary Examiner*—Mark Paschall
*Attorney, Agent, or Firm*—Wood, Herron & Evans, L.L.P.

[57] ABSTRACT

A method for substantially maintaining an average heating temperature over a period of time without the aid of a temperature sensor. The method provides an apparatus which has an ignition device that is adapted to ignite a fuel. The apparatus may be a cooking appliance or practically any other device that is adapted to heat something. The fuel may be natural gas, propane gas, or practically any other fuel that may be ignited to provide heat. Conveyance means are provided for receiving the fuel from a source of the fuel and conveying the fuel to the ignition device. A valve is interposed on the conveyance means between the ignition device and the source of fuel. In order to substantially maintain the average heating temperature over the period of time, the valve is opened and closed in a predetermined pattern such that at least a portion of the fuel conveyed to the ignition device is ignited.

45 Claims, 7 Drawing Sheets

METHOD AND APPARATUS FOR SUBSTANTIALLY MAINTAINING AN AVERAGE HEATING TEMPERATURE OVER A PERIOD OF TIME

This is a continuation-in-part of U.S. application Ser. No. 08/591,398, filed Jan. 25, 1996, now U.S. Pat. No. 5,813,394. U.S. application Ser. No. 08/591,398 is a continuation-in-part of U.S. application Ser. No. 08/283,992, filed Aug. 1, 1994, now U.S. Pat. No. 5,617,840. U.S. application Ser. No. 08/283,992 is a continuation-in-part of U.S. application Ser. No. 07/856,347, filed Mar. 23, 1992, now U.S. Pat. No. 5,333,596.

BACKGROUND AND SUMMARY OF THE INVENTION

The present invention relates generally to heating methods and devices, and more particularly, to methods and devices for substantially maintaining an average heating temperature over a period of time without the aid of a temperature sensor. The present invention will be described primarily with regard to a cooking grill which has or is connected to a source of fuel. However, it should be recognized that the methods and devices of the present invention may be used for or in conjunction with practically any apparatus which is adapted to provide heat.

Fuel-connected devices including, but not limited to, cooking grills may include a burner, a conduit for conveying a fuel to the burner, and an igniter adapted to ignite the fuel at the burner. The fuel may be natural gas, propane gas, or practically any other fuel that may be ignited to provide heat. The fuel may be supplied from a metered house supply or a portable, refillable storage tank.

In order to control the heating temperature of known fuel-connected devices, the amount of fuel flowing to the burner may be varied so as to adjust the strength of the cooking flame. The problem with this method is that the cooking flame may be undesirably extinguished at low flow rates. Unignited fuel will continue to flow to the burner even if the wind or other means extinguishes the flame. In addition to wasting fuel, this condition may also present a safety hazard.

Known fuel-connected devices may also control the temperature by cycling the burner based on data from a temperature sensing device which is fed to an electronic control assembly. Nonetheless, this method requires a temperature sensing device, and it is unnecessarily complex. In addition, it may require associated assembly and inventory costs as well as parts failure and warranty costs.

Devices having an electric heating element may also use a temperature sensing device to monitor the heating temperature and to provide data to a control circuit for use in adjusting the power supplied to the electric heating element. Again, this unnecessarily complex method requires a temperature sensing device. Likewise, this method may require associated assembly costs, inventory costs, costs due to the failure of parts, and warranty costs.

In light of the shortcomings of the known art, a need exists for a method and apparatus for controlling the heating temperature of a flame without making the flame susceptible to being undesirably extinguished. A need also exists for a method and apparatus for substantially maintaining an average heating temperature of a flame over a period of time without the aid of a temperature sensor. Still another need exists for a method and apparatus for adjusting the power supplied to an electric heating element in order to substantially maintain an average heating temperature over a period of time without the aid of a temperature sensor.

Preferred embodiments of the present invention satisfy some or all of these needs. One preferred embodiment provides a method for substantially maintaining an average heating temperature over a period of time without the aid of a temperature sensor. This method involves an apparatus which has an ignition device that is adapted to ignite a fuel. The apparatus may be a cooking appliance and/or practically any other device that is adapted to heat something. The fuel may be natural gas, propane gas, or practically any other fuel that may be ignited to provide heat. Conveyance means are provided for receiving the fuel from a source of the fuel and conveying the fuel to the ignition device. A valve is interposed on the conveyance means between the ignition device and the source of fuel. In order to substantially maintain the average heating temperature over the period of time, the valve is opened and closed in a predetermined pattern such that at least a portion of the fuel conveyed to the ignition device is ignited.

This method may further comprise a control circuit in electrical communication with the valve. The control circuit is preferably adapted to open and close the valve in the predetermined pattern. The control circuit may include a microprocessor, a microcontroller, or practically any other device which has similar processing capabilities. The control circuit also preferably includes a memory device which is adapted to store at least one predetermined pattern for opening and closing the valve in order to substantially maintain at least one average heating temperature. The control circuit is preferably adapted to recall from the memory device the predetermined pattern to substantially maintain the average heating temperature over the period of time. In addition, the method may further comprise an input device in electrical communication with the control circuit such that a user may enter a desired average heating temperature, food type, weight of food, and/or practically any other relevant data. With some or all of this information, the control circuit may select an appropriate pattern of opening and closing the valve to substantially maintain the desired average heating temperature over the period of time.

Another method for substantially maintaining an average heating temperature over a period of time without the aid of a temperature sensor also involves an apparatus which has an ignition device that is adapted to ignite a fuel. The apparatus may be a cooking appliance and/or practically any other device that is adapted to provide heat. The fuel may be natural gas, propane gas, or practically any other fuel that may be ignited to provide heat. In this method, the fuel is intermittently conveyed to the ignition device in a predetermined pattern such that at least a portion of the fuel conveyed to the ignition device is ignited and the average heating temperature is substantially maintained over the period of time. This method may further comprise providing conveyance means for receiving the fuel from a source of the fuel and conveying the fuel to the ignition device. A valve may be interposed on the conveyance means between the source of fuel and the ignition device. The valve is preferably adapted to open and close such that the fuel is intermittently conveyed to the ignition device substantially in the predetermined pattern.

A control circuit may be provided in electrical communication with the valve. The control circuit is preferably adapted to open and close the valve such that the fuel is intermittently conveyed to the ignition device substantially in the predetermined pattern. The control circuit may include a microprocessor, a microcontroller, or practically any other device having suitable processing capabilities. The control circuit may also include a memory device which is adapted to store at least one predetermined pattern for opening and closing the valve in order to substantially maintain at least one average heating temperature. The control circuit is preferably adapted to recall from the memory device the predetermined pattern of opening and closing the valve to substantially maintain the average heating temperature over the period of time. An input device may be provided in electrical communication with the control circuit such that a user can enter a desired average heating temperature, food type, weight of food, and/or practically any other relevant data. The control circuit may use some or all of this information to select an appropriate pattern of opening and closing the valve to substantially maintain the desired average heating temperature over the period of time.

The present invention also provides a method for substantially maintaining an average heating temperature of an apparatus which has an electric heating element over a period of time without the aid of a temperature sensor. The apparatus may be a cooking appliance and/or practically any other device that is adapted to provide heat. This method adjusts the power provided to the electric heating element in a predetermined pattern such that the average heating temperature is substantially maintained over the period of time.

A control circuit may be provided in electrical communication with the electric heating element. The control circuit is preferably adapted to adjust the power provided to the electric heating element. The control circuit may include a microprocessor, a microcontroller, or practically any other device having suitable processing capabilities. The control circuit may also include a memory device which is adapted to store at least one predetermined pattern for adjusting the power provided to the electric heating element in order to substantially maintain at least one average heating temperature. The control circuit is preferably adapted to recall from the memory device the predetermined pattern of adjusting the power provided to the electric heating element to substantially maintain the average heating temperature over the period of time. In addition, an input device may be provided in electrical communication with the control circuit such that a user may enter a desired average heating temperature, food type, weight of food, and/or practically any other relevant data. Using some or all of this information, the control circuit is preferably adapted to select an appropriate pattern of adjusting the power provided to the electric heating element to substantially maintain the desired average heating temperature over the period of time.

The present invention also includes an apparatus for substantially maintaining an average heating temperature over a period of time without the aid of a temperature sensor. The apparatus may be a cooking appliance and/or practically any other device that is desired to heat something. This embodiment of the apparatus comprises an ignition device which is adapted to ignite a fuel. The fuel may be natural gas, propane gas, or practically any other fuel that may be ignited to provide heat. Conveyance means receive the fuel from a source of the fuel and convey the fuel to the ignition device. A valve is interposed on the conveyance means between the ignition device and the source of fuel. A control circuit is in electrical communication with the valve. The control circuit is adapted to open and close the valve in a predetermined pattern such that at least a portion of the fuel conveyed to the ignition device is ignited and the average heating temperature is substantially maintained over the period of time.

The control circuit is preferably microprocessor-based, microcontroller-based, or has other suitable processing capabilities. The control circuit may include a memory device which is adapted to store at least one predetermined pattern for opening and closing the valve in order to substantially maintain at least one average heating temperature. The control circuit is preferably adapted to recall from the memory device the predetermined pattern to substantially maintain the average heating temperature over the period of time. The apparatus may further comprise an input device in electrical communication with the control circuit such that a user can enter a desired average heating temperature, food type, weight of food, and/or practically any other relevant data. The control circuit is preferably adapted to use some or all of this information to select an appropriate pattern of opening and closing the valve to substantially maintain the desired average heating temperature over the period of time.

Another embodiment of an apparatus of the present invention comprises an electric heating element and a control circuit in electrical communication with the electric heating element. The apparatus may be a cooking appliance and/or practically any other device that is desired to heat something. The electric heating element is adapted to generate heat. The control circuit is adapted to adjust the power provided to the electric heating element in a predetermined pattern such that an average heating temperature is substantially maintained over a period of time without the aid of a temperature sensor.

The control circuit is preferably microprocessor-based, microcontroller-based, or has other suitable processing capabilities. The control circuit may include a memory device which is adapted to store at least one predetermined pattern for adjusting the power provided to the electric heating element in order to substantially maintain at least one average heating temperature. The control circuit may recall from the memory device the predetermined pattern of adjusting the power provided to the electric heating element to substantially maintain the average heating temperature over the period of time. In addition, the apparatus may further comprise an input device in electrical communication with the control circuit such that a user may enter a desired average heating temperature, food type, weight of food, and/or practically any other relevant data. With this information, the control circuit is preferably adapted to select an appropriate pattern of adjusting the power provided to the electric heating element to substantially maintain the desired average heating temperature over the period of time.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
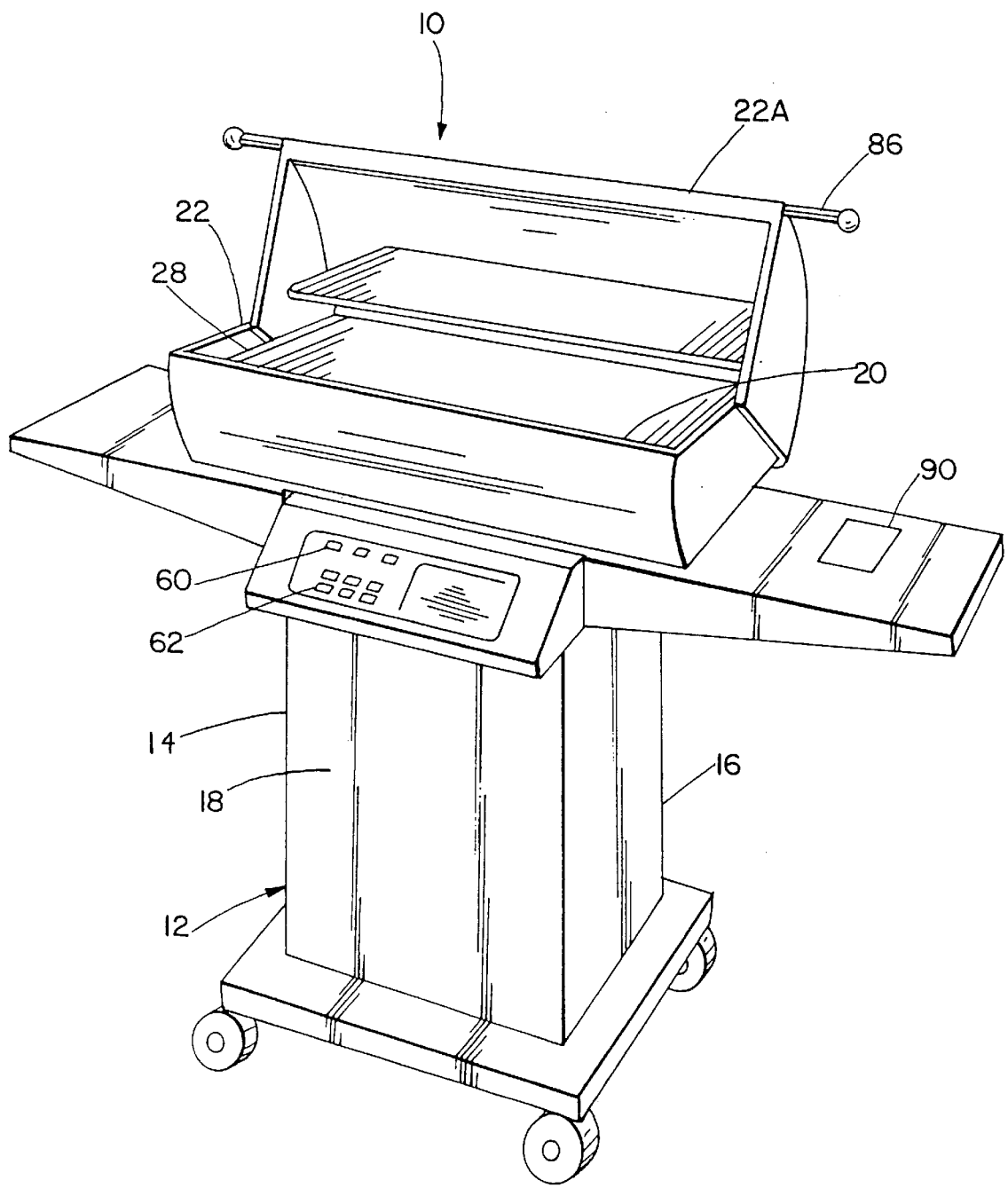
FIG. 1 is a perspective view of a preferred embodiment of an outdoor grill of the present invention.

The present invention is directed to methods and devices for substantially maintaining an average heating temperature over a period of time without the aid of a temperature sensor. The present invention will be described primarily with regard to a cooking grill. However, it should be recognized that the present invention may be used for or in conjunction with practically any apparatus which is adapted to provide heat.

For example, the present invention may be used for or in conjunction with practically any apparatus that is adapted to provide heat by igniting natural gas, propane gas, or practically any other fuel that may be ignited to provide heat. In particular, the apparatus may be a cooking appliance such as, but not limited to, a grill, an oven, a cooktop, a fryer, a stove, a range, a toaster, or practically any other type of gas cooking appliance. The apparatus may also be a device which is not a cooking appliance. For instance, the apparatus may be a heater, a furnace, a water heater, a dryer, a fire place, or practically any other type of non-cooking appliance that heats something by igniting fuel.

The ignition device may be practically any device that is adapted to ignite fuel. For instance, the ignition device may be a single electrode spark ignition system or a dual electrode spark ignition system. The ignition device may also be a hot surface igniter.

The fuel is preferably conveyed to the ignition device by a conduit. The conduit may have a cylindrical shape. However, it should be recognized that the conduit may have practically any shape, cross section, and configuration subject only to functional considerations. For instance, the conduit may have a polygonal cross section. It should be further recognized that the conveyance means may be practically any type of tube, channel, duct, canal, or pipe that is adapted to receive the fuel from a source of the fuel and convey the fuel to the ignition device.

The present invention may also be used for or in conjunction with practically any apparatus that uses an electric heating element to provide heat. For instance, the apparatus may be a cooking appliance such as, but not limited to, a grill, an oven, a cooktop, a fryer, a stove, a toaster, or practically any other cooking appliance that may have an electric heating element. The apparatus may also be a device which is not a cooking appliance including, but not limited to, a heater, a furnace, a water heater, a dryer, or practically any other non-cooking appliance that uses an electric heating element to heat something.

One embodiment of an apparatus of the present invention is a cooking grill. A cooking grill may have a food-positioning rack, a burner disposed below the rack for distributing a flame, a conduit for conveying a cooking fuel to the burner, a source of cooking fuel connected to the conduit, an ignition device adapted to ignite fuel at the burner, a control circuit, and connective means for electrically connecting the control circuit to a source of electricity. The cooking grill may also have an electrically actuated fuel shut-off valve interposed on the conduit between the source of fuel and the burner. The valve is preferably connected to the control circuit, and the control circuit is preferably adapted to open and close the valve.

The cooking grill may also have a regulator in association with the shut-off valve for maintaining a substantially constant fuel flow rate so as provide a known fuel level over time to the burner. The control circuit preferably monitors the time the valve has been open. The cooking grill may also have an input device connected to the control circuit. The shut-off valve can be opened or closed in response to an input to the input device. The input device may be a touch keypad, a keyboard, a switch, a rotary switch, a button, a voice-activated control, or practically any other type of input device. The cooking grill may also have an output device such as an audio device or a display device.

The control circuit may open and close the shut-off valve in a predetermined pattern so that an average heating temperature in the grill is substantially maintained over a period of time. The predetermined pattern may be stored on a microprocessor, a microcontroller, or any other type of suitable memory device. In addition, the source of electricity may be a battery charged by a solar panel.

Another embodiment of a cooking grill may have a food positioning surface, a conduit for conveying heat to the surface, a coupling connecting the conduit to a source of energy for creating heat, and a control circuit electrically connected to the source of energy which may periodically open and close the coupling in response to a predetermined pattern so that an average temperature in the grill is maintained. The predetermined pattern may be stored on a microprocessor, a microcontroller, or any other suitable type of memory device.

Figure 3:
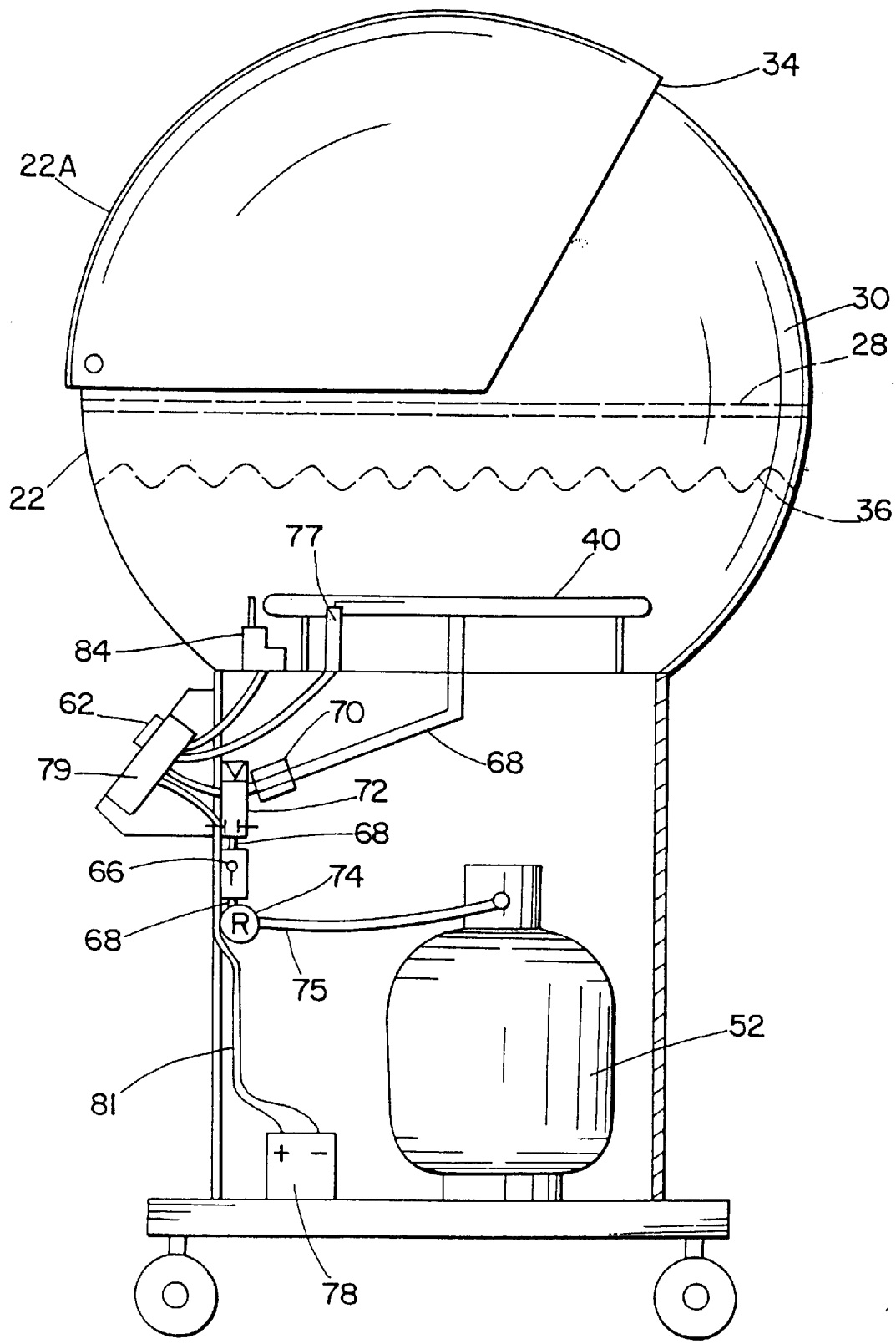
FIG. 3 is a cross sectional view of the grill of FIG. 1.

FIGS. 1 and 3 show various views of one embodiment of an apparatus of the present invention. As illustrated in FIG. 1, an outdoor grill 10 is provided which comprises a housing 12 having laterally spaced apart side walls 14, 16, a front wall 18 rigidly connected to the side walls, a base equipped with casters or wheels, and a generally cylindrical cooking cavity 22. The cooking cavity 22 may include a roll top lid 22A hingedly connected to the side walls of the cooking cavity 22 and two shelves extending from the side walls.

Advantageously, the side walls 14, 16 and front wall 18 may be formed from one sheet of steel, although it may also be possible to fasten the individual side walls together. Extending horizontally within the cooking cylinder at the level of the upper edge of the front wall 20 may be a food-receiving rack 28. Alternatively, the rack 28 may be fastened to the housing 12 so as to be vertically adjustable therein. In any event, the rack 28 may be securely mounted in the housing 12 so that it serves as a barrier which protects the lower components. As illustrated in FIG. 3, a cooking chamber 30 may be defined when the lid 22A is closed, and access to the food-positioning rack 28 may be facilitated when the lid 22A is rolled open. Air flow through the cooking chamber 30 is preferably provided by vent 34 in the top of the cooking cavity.

As illustrated in FIG. 3, the cooking chamber 30 is also preferably provided with a horizontally disposed grate 36 mounted below the food-receiving rack 28. The grate may be welded at perimeter edge portions thereof to adjoining portions of the front, side and rear walls, or it may be fastened to the cooking chamber 30 so as to be vertically adjustable therein. The grate may be heated directly by a burner 40 disposed therebelow and to diffuse and radiate heat over a relatively large portion of the food-receiving rack 28.

A manual flow control valve may be interposed in the fuel conduit to control flow of fuel to the burner. An aperture 70 may be provided in the gas supply pipe 68 to permit the admixture of air with the cooking gas. If desired, a control assembly (not shown) may be provided to vary the size of the air inlet 70.

Figure 2:
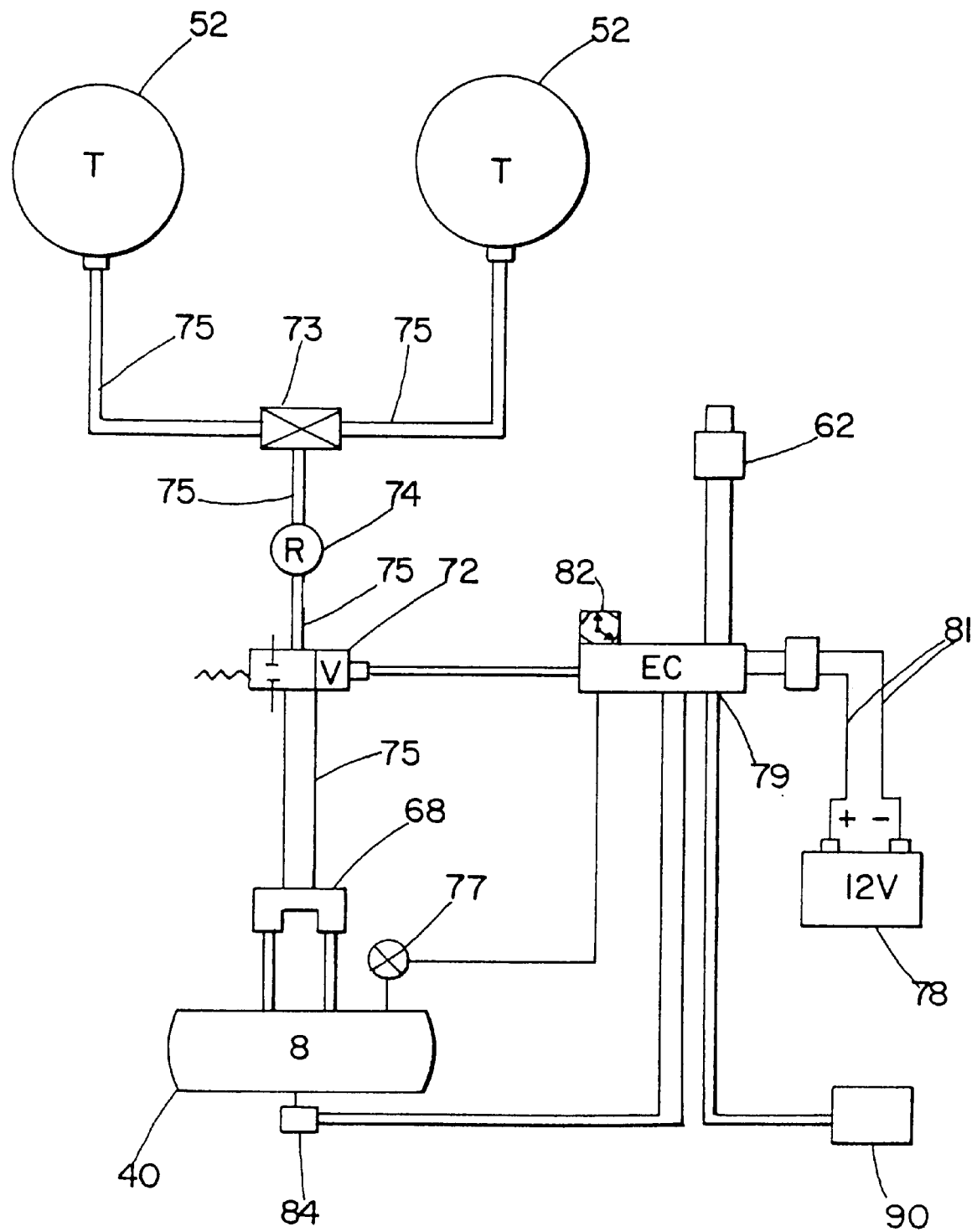
FIG. 2 is a schematic view of the operative components of a preferred embodiment of a cooking grill of the present invention.

As illustrated diagrammatically in FIG. 2, the gas supply pipe 68 may be connected to a solenoid-actuated valve 72 via a conduit 75. A conventional flow regulator 74 may be interposed between the valve 73 and the solenoid-actuated valve 72. The solenoid-actuated valve 72 is preferably electrically connected to a control circuit 79 which may store and/or house a program and a timer for controlling the ignition, flow of gas, safety features, and visual display, as described in some detail below.

A 12-volt battery 78 may be connected via conductor 81 to the control circuit 79. The battery 78 may be assisted by or replaced by a solar cell 90. A 120V or 220V power supply, for example, may also replace the battery 78.

The program of the control circuit 79 is preferably electrically connected to the input/output device 62, a timer or integral clock 82 on the control circuit 79, and the battery 78 via the conductor 81. The control circuit 79 is preferably equipped with conventional switching mechanisms for controlling the flow of current from the battery 78 to the solenoid-actuated valve 72 in response to signals from the hard-coded program. In addition, the control circuit 79 may be connected to a digital display 60.

The input/output device 62 may be any conventional input device such as, but not limited to, a touch keypad, a keyboard, a switch, a rotary switch, a button, or a voice-activated control. If desired, the input device may be combined with any conventional output device, such as a visual display, an audible alarm, or a flashing light.

Figure 4A:
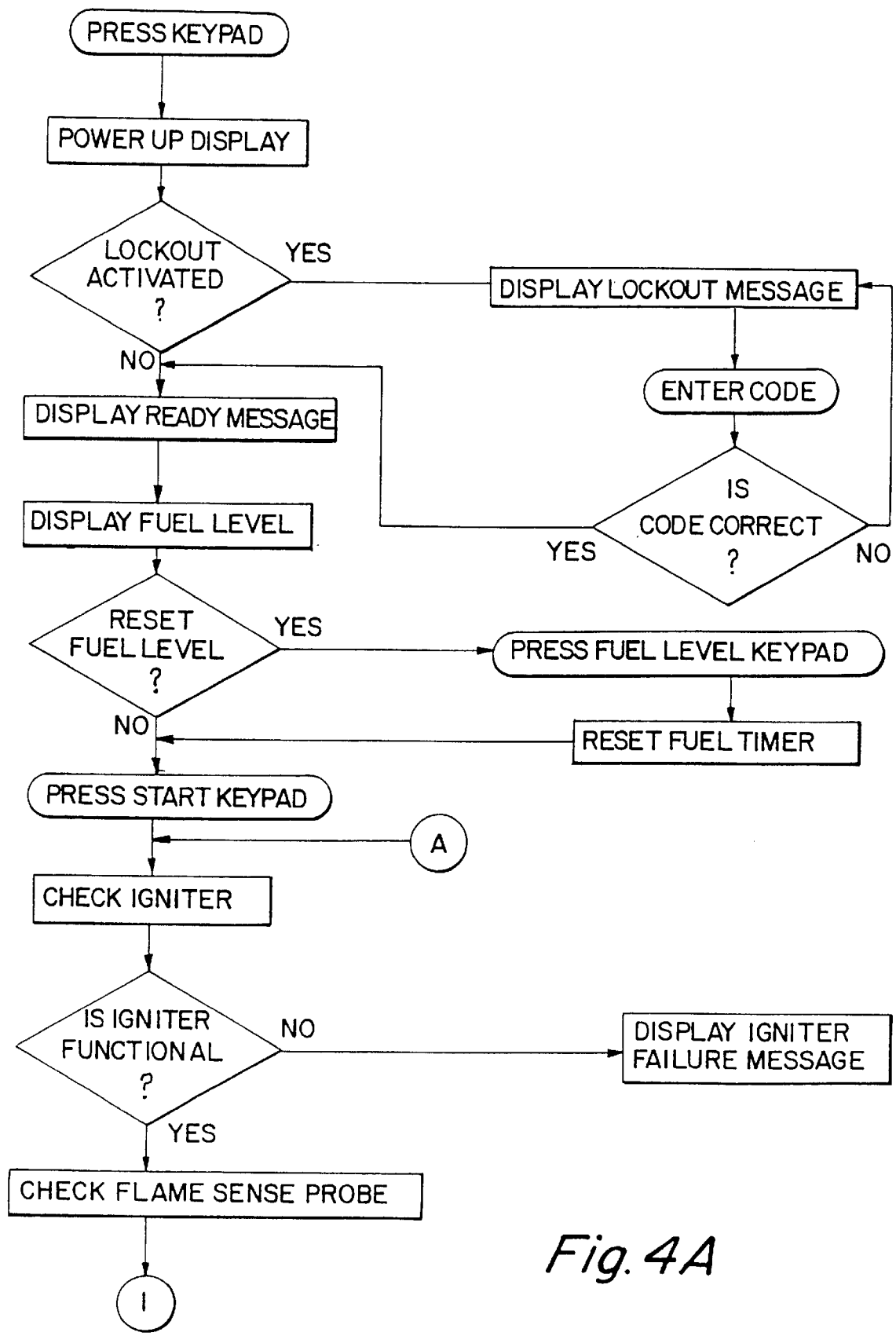
FIGS. 4A–C show a flow chart illustrating the logic sequence of a preferred embodiment of a control program of the present invention.
Figure 4B:
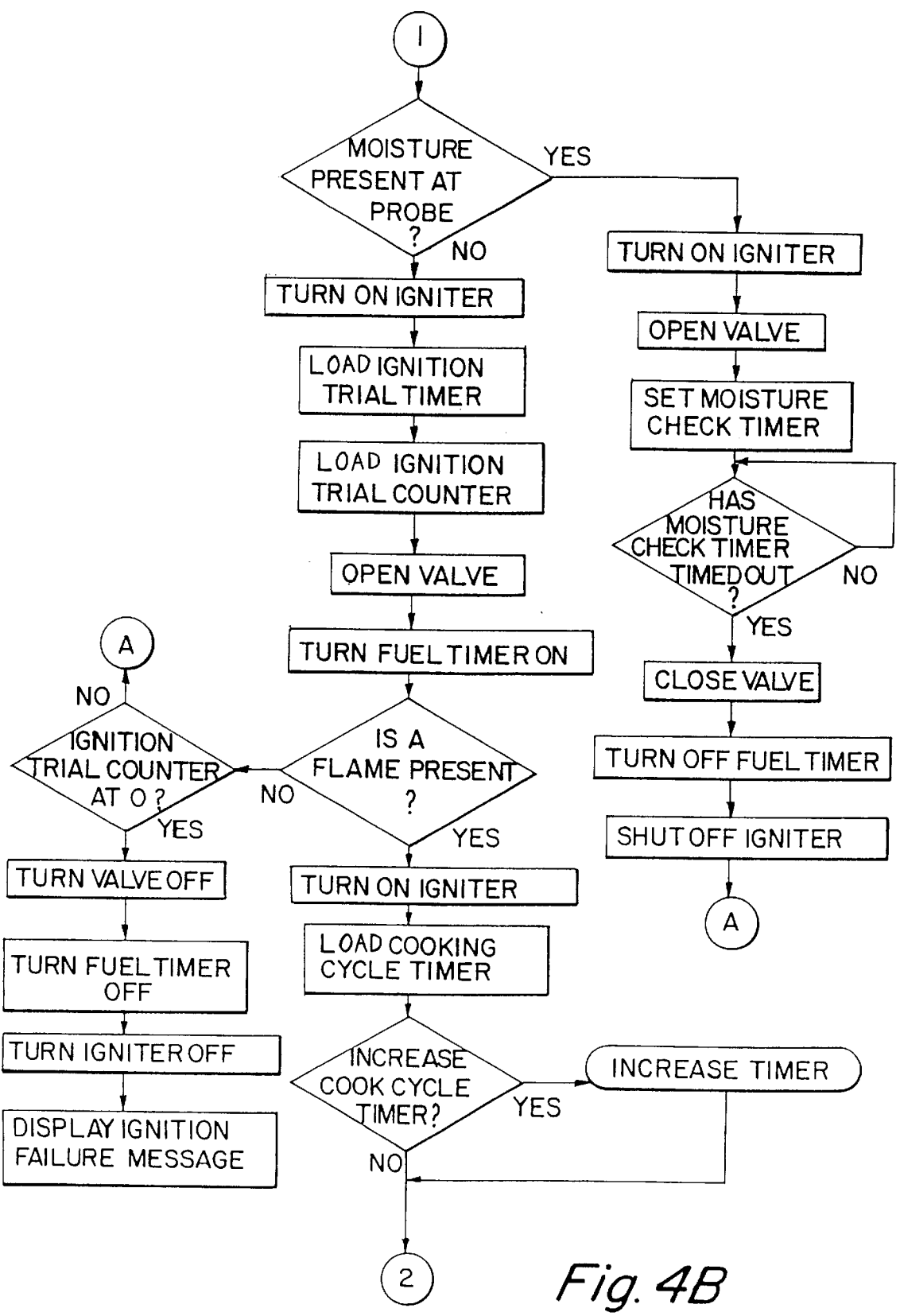
Figure 4C:
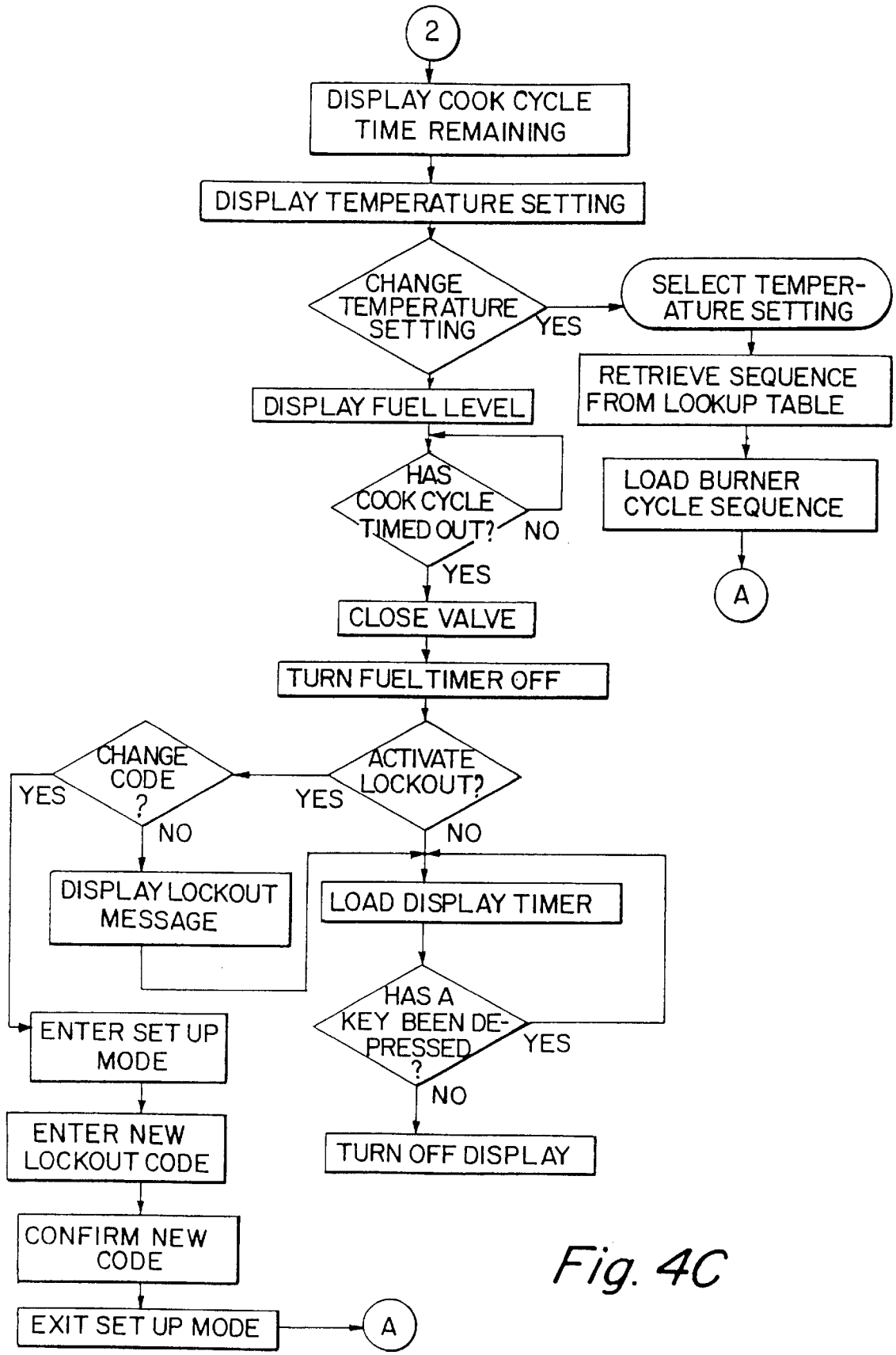

The control program for the present cooking grill 10 may operate in the preferred manner illustrated in the flow chart of FIGS. 4A–C. The user may lift the lid 22A by a handle 86 and either place the food to be cooked on the rack 28 or wait to do so until the cooking chamber 30 has reached a suitable temperature. The user may then enter a code on the input/output device 62, whereupon the input/output device 62 may provide a signal to the control circuit 79 which, in turn, preferably displays a system ready notice on the input/output device 62 if the proper code was entered. If an improper code was entered, the system may display a lock-out message.

In a program routine, the control circuit 79 may signal the solenoid-actuated valve 72 to open, and gas preferably flows to the burner 40. Shortly thereafter, the control circuit 79 may activate an igniter 84. If a flame detector 77 is activated by a flame on the burner 40, a signal may be sent to the control circuit 79 to turn off the igniter 84. If no flame is detected, the igniter and solenoid-actuated valve 72 may remain open for a selected period of time, whereupon a "no gas" or "no ignition" message may be presented on the input/output device 62, the solenoid-actuated valve 72 may close, and the igniter 84 may be shut off. As may be readily understood, the foregoing portion of the program preferably prevents unignited gas from continuing to flow from the tank 52 in the event that the igniter 84 fails to create a flame at the burner 40 within a selected period of time. As an alternative, the igniter 84 may be left on whenever the gas valve 72 is open in order to eliminate the need for the flame sensor 77.

If a flame is created at the burner 40, the flame detector 77 may signal the control circuit 79 to that effect, and the control circuit preferably turns the igniter 84 off. The solenoid-actuated valve 72 may remain open, and gas may continue to flow to the burner for a selected period of time which may be set by entry on the input/output device 62. During the time in which a flame is present at the burner, a user may control the temperature in the cooking chamber 30 by inputting the desired setting on the input/output device. The manual valve 66 is preferably mounted in the gas pipe 68 so that the operator may, by manipulating the control lever effectively, manually restrict the flow of gas. While the gas is flowing and a flame is present, the user may place food on the rack 28 and may close the lid 22A, if desired, without extinguishing the flame. The amount of time remaining in a given cooking cycle may be displayed periodically or continuously so that the user may be able to gauge whether the food is properly cooked before additional time is added. Once the cooking cycle has timed out, the control circuit 79 preferably closes the solenoid actuated shut-off valve 72.

Another preferred method of operation of the grills of the present invention is to electronically control fuel flow and cooking temperature by having the user press a high, medium, or low key, for example, on a keypad or enter a set temperature. The control circuit 79, preferably initiates a cycle of terminating gas flow to the burner by turning off the solenoid actuated shut-off valve 72 for a preset time interval and then restoring gas flow to the burner by opening the solenoid actuated shut-off valve 72 and turning on the igniter 84 to reignite the gas, or by adjusting the electrical current to an electric cooking grid. The control circuit 79 preferably continues this sequence until a preset time is expired. Because the flow rate of the gas to the burner is preferably not reduced, the burner may be less susceptible to being extinguished by the wind.

Figure 5:
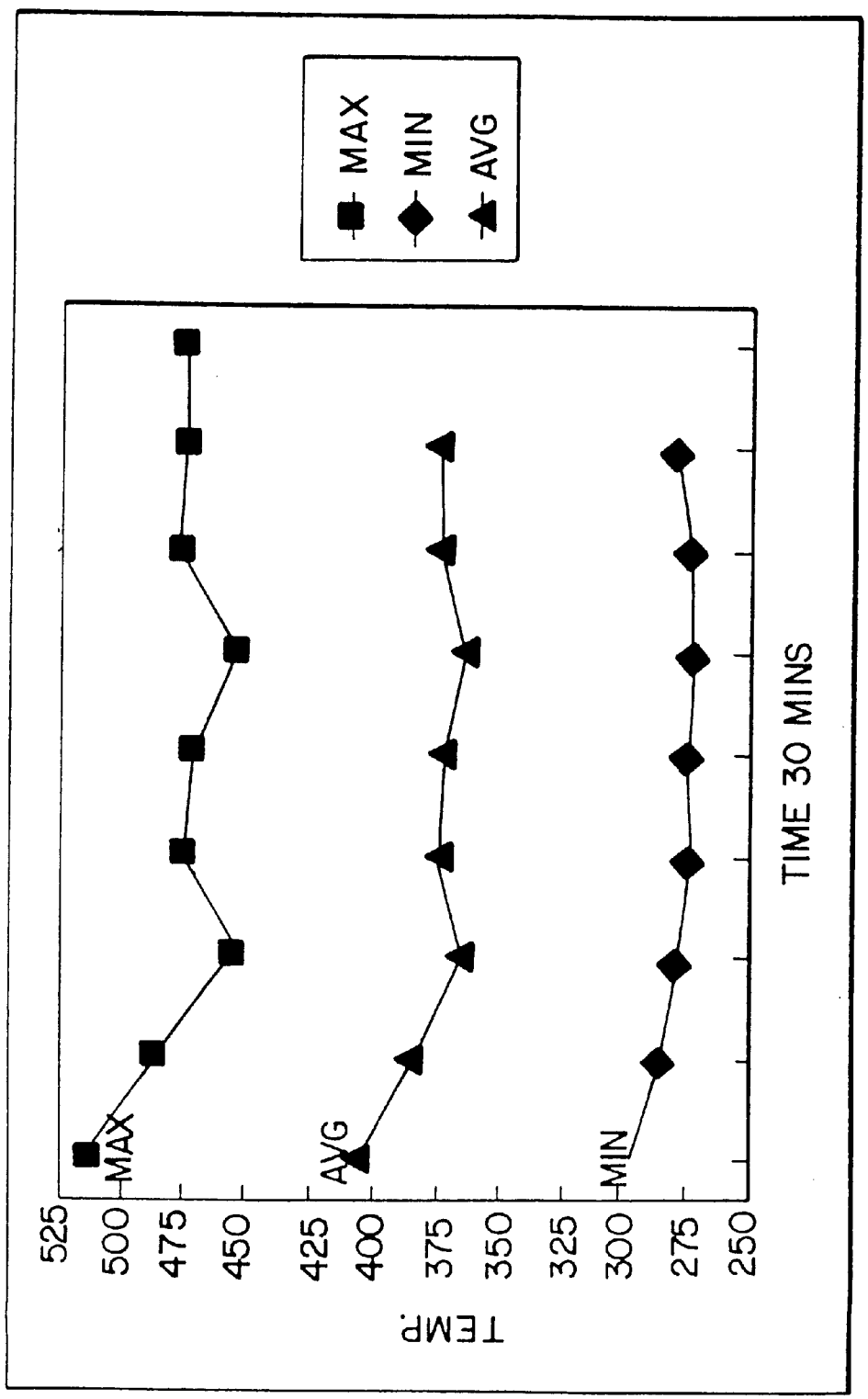
FIG. 5 is a chart showing an example average temperature achieved by a grill over a period of time with a specified on-off cycling of the burner.

The proper cycling sequence for different temperatures may be obtained by recording various on/off time sequences and the resultant temperatures achieved. The results of an example test are shown in FIG. 5. In FIG. 5, the burner was initially turned on for a three minute period to bring the grill up to temperature. At that point, the burner was cycled on for one minute, and off for 1 minute, 45 seconds. As FIG. 5 shows, this example yielded an average temperature of substantially 375° F. over a period of time. Similar cycling times may be obtained for a proper cycling sequence for other temperatures. This information may then be stored on a microprocessor, microcontroller, or any other suitable type of memory device used in the control circuit. When a user desires a certain grill operating temperature, the microprocessor may recall from memory the proper cycling sequence for the desired temperature and cause the burner to cycle on and off accordingly.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for substantially maintaining an average heating temperature over a period of time without the aid of a temperature sensor, said method comprising:

providing an apparatus comprising an ignition device adapted to ignite a fuel;

providing conveyance means for receiving said fuel from a source of said fuel and conveying said fuel to said ignition device;

providing a valve interposed on said conveyance means between said ignition device and said source of fuel; and opening and closing said valve in a predetermined pattern such that at least a portion of said fuel conveyed to said ignition device is ignited and said average heating temperature is substantially maintained over said period of time.

2. The method of claim 1 further comprising:
providing a control circuit in electrical communication with said valve, said control circuit adapted to open and close said valve in said predetermined pattern.

3. The method of claim 2 wherein said control circuit includes a microprocessor.

4. The method of claim 2 wherein said control circuit includes a microcontroller.

5. The method of claim 2 wherein said control circuit includes a memory device, and said control circuit is adapted to recall from said memory device said predetermined pattern to substantially maintain said average heating temperature over said period of time.

6. The method of claim 5 further comprising:
providing an input device in electrical communication with said control circuit such that a user can enter data selected from the group consisting of a desired average heating temperature, a type of food, or a weight of food;
wherein said control circuit is adapted to select an appropriate pattern of opening and closing said valve to substantially maintain said desired average heating temperature over said period of time.

7. The method of claim 1 wherein said apparatus is a cooking appliance.

8. The method of claim 1 wherein said fuel is natural gas.

9. The method of claim 1 wherein said fuel is propane.

10. A method for substantially maintaining an average heating temperature over a period of time without the aid of a temperature sensor, said method comprising:
providing an apparatus comprising an ignition device adapted to ignite a fuel; and
intermittently conveying said fuel to said ignition device in a predetermined pattern such that at least a portion of said fuel conveyed to said ignition device is ignited and said average heating temperature is substantially maintained over said period of time.

11. The method of claim 10 further comprising:
providing conveyance means for receiving said fuel from a source of said fuel and conveying said fuel to said ignition device.

12. The method of claim 11 further comprising:
providing a valve interposed on said conveyance means between said source of fuel and said ignition device, said valve adapted to open and close such that said fuel is intermittently conveyed to said ignition device substantially in said predetermined pattern.

13. The method of claim 12 further comprising:
providing a control circuit in electrical communication with said valve, said control circuit adapted to open and close said valve such that said fuel is intermittently conveyed to said ignition device substantially in said predetermined pattern.

14. The method of claim 13 wherein said control circuit includes a microprocessor.

15. The method of claim 13 wherein said control circuit includes a microcontroller.

16. The method of claim 13 wherein said control circuit includes a memory device, and said control circuit is adapted to recall from said memory device said predetermined pattern of opening and closing said valve to substantially maintain said average heating temperature over said period of time.

17. The method of claim 16 further comprising:
providing an input device in electrical communication with said control circuit such that a user can enter data selected from the group consisting of a desired average heating temperature, a type of food, or a weight of food;
wherein said control circuit is adapted to select an appropriate pattern of opening and closing said valve to substantially maintain said desired average heating temperature over said period of time.

18. The method of claim 10 wherein said apparatus is a cooking appliance.

19. The method of claim 10 wherein said fuel is natural gas.

20. The method of claim 10 wherein said fuel is propane.

21. A method for substantially maintaining an average heating temperature over a period of time without the aid of a temperature sensor, said method comprising:
providing an apparatus having an electric heating element;
adjusting the power provided to said electric heating element in a predetermined pattern such that said average heating temperature is substantially maintained over said period of time.

22. The method of claim 21 further comprising:
providing a control circuit in electrical communication with said electric heating element, said control circuit adapted to adjust the power provided to said electric heating element.

23. The method of claim 22 wherein said control circuit includes a microprocessor.

24. The method of claim 22 wherein said control circuit includes a microcontroller.

25. The method of claim 22 wherein said control circuit includes a memory device, and said control circuit is adapted to recall from said memory device said predetermined pattern of adjusting the power provided to said electric heating element to substantially maintain said average heating temperature over said period of time.

26. The method of claim 25 further comprising:
providing an input device in electrical communication with said control circuit such that a user can enter data selected from the group consisting of a desired average heating temperature, a type of food, or a weight of food;
wherein said control circuit is adapted to select an appropriate pattern of adjusting the power provided to said electric heating element to substantially maintain said desired average heating temperature over said period of time.

27. The method of claim 21 wherein said apparatus is a cooking appliance.

28. An apparatus for substantially maintaining an average heating temperature over a period of time without the aid of a temperature sensor, said apparatus comprising:
an ignition device adapted to ignite a fuel;
conveyance means for receiving said fuel from a source of said fuel and conveying said fuel to said ignition device;
a valve interposed on said conveyance means between said ignition device and said source of fuel; and
a control circuit in electrical communication with said valve, said control circuit adapted to open and close said valve in a predetermined pattern such that at least a portion of said fuel conveyed to said ignition device is ignited and said average heating temperature is substantially maintained over said period of time.

29. The apparatus of claim 28 wherein said apparatus is a cooking appliance.

30. The apparatus of claim 29 wherein said apparatus is a grill.

31. The apparatus of claim 29 wherein said apparatus is an oven.

32. The apparatus of claim 29 wherein said apparatus is a cooktop.

33. The apparatus of claim 29 wherein said apparatus is a fryer.

34. The apparatus of claim 29 wherein said apparatus is a stove.

35. The apparatus of claim 28 wherein said apparatus is a heater.

36. The apparatus of claim 28 wherein said apparatus is a furnace.

37. The apparatus of claim 28 wherein said apparatus is a water heater.

38. The apparatus of claim 28 wherein said apparatus is a dryer.

39. The apparatus of claim 28 wherein said apparatus is a fire place.

40. The apparatus of claim 28 wherein said fuel is natural gas.

41. The apparatus of claim 28 wherein said fuel is propane.

42. The apparatus of claim 28 wherein said control circuit is microprocessor-based.

43. The apparatus of claim 28 wherein said control circuit is microcontroller-based.

44. The apparatus of claim 28 wherein said control circuit includes a memory device, and said control circuit is adapted to recall from said memory device said predetermined pattern to substantially maintain said average heating temperature over said period of time.

45. The apparatus of claim 44 further comprising:

an input device in electrical communication with said control circuit such that a user can enter data selected from the group consisting of a desired average heating temperature, a type of food, or a weight of food;

wherein said control circuit is adapted to select an appropriate pattern of opening and closing said valve to substantially maintain said desired average heating temperature over said period of time.

* * * * *